US007216617B2

(12) United States Patent
Tanaka et al.

(10) Patent No.: US 7,216,617 B2
(45) Date of Patent: May 15, 2007

(54) ENGINE STARTING ASSIST SYSTEM

(75) Inventors: Yasuhiro Tanaka, Kariya (JP); Makoto Kawatsu, Anjo (JP); Nobutomo Takagi, Okazaki (JP); Naoki Maeda, Nisshin (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/246,275

(22) Filed: Oct. 11, 2005

(65) Prior Publication Data

US 2006/0080027 A1 Apr. 13, 2006

(30) Foreign Application Priority Data

Oct. 12, 2004 (JP) ............................. 2004-297594

(51) Int. Cl.
*F02N 11/08* (2006.01)
*H02J 1/10* (2006.01)

(52) U.S. Cl. ................. 123/179.3; 701/113; 290/38 R; 307/46

(58) Field of Classification Search ..................... None
See application file for complete search history.

(56) References Cited

U.S. PATENT DOCUMENTS 4,896,637 A * 1/1990 Yamamoto ............... 123/179.3
2004/0168664 A1 9/2004 Senda et al.

FOREIGN PATENT DOCUMENTS

JP A-6-229312 8/1994

* cited by examiner

*Primary Examiner*—Andrew M. Dolinar
(74) *Attorney, Agent, or Firm*—Posz Law Group, PLC

(57) ABSTRACT

An engine starting assist system includes an auxiliary ECU having a voltage booster, an engine ECU, a starter relay, and a starter that allows the engine to be started when a current flows through the starter relay. The auxiliary ECU and the engine ECU are powered by a battery and supply currents to the starter relay. When the engine ECU resets the supply of the current to the starter relay because of a voltage drop of the battery during starting of the engine, the auxiliary ECU increases the voltage supplied from the battery using the booster, thereby supplying the current to the starter relay.

16 Claims, 5 Drawing Sheets

ENGINE STARTING ASSIST SYSTEM

CROSS REFERENCE TO RELATED APPLICATION

This application is based on Japanese Patent Application No. 2004-297594 filed on Oct. 12, 2004, the disclosure of which is incorporated herein by reference.

FIELD OF THE INVENTION

The present invention relates to an engine starting assist system having an engine starter.

BACKGROUND OF THE INVENTION

An engine starting system having an engine starter has been known (for example, US 2004-0168664A1 corresponding to JP-A-2004-257369). In the system, an electric current is supplied to a starter motor of the engine starter to start an engine.

FIG. 4 is a schematic circuit diagram of an engine starting system 40 experimentally built to improve a conventional engine starting system. The system 40 includes two switches 101, 102, a starter relay 103 having a coil 103*a* and a relay switch 103*b*, a starter 104 having a starter motor 104*a* and a electromagnetic switch coil 104*b* for engaging the starter motor 104*a* to an engine, and an engine electronic control unit (ECU) 105. The switch 101 is turned on, when a key cylinder is turned to a start position. In an automatic transmission vehicle, the switch 102 is turned on when a gear is in a neutral position or a parking position. In a manual transmission vehicle, the switch 102 is turned on when a clutch pedal is pressed. When a driver turns the key cylinder to the start position as long as the switch 102 is ON, a current I 107 is supplied from a terminal 107 to the starter relay 103 and the engine ECU 105 receives a signal indicating that the key cylinder is turned on. Then, the engine ECU 105 provides a fuel injection signal to the engine and supplies a current I 105 to the starter relay 103. In this case, not only the current I 107 but also the current I 105 flow through the starter relay 103. Therefore, the starter relay 103 is surely activated during starting of the engine.

When the current I 105, or I 107 flows through the coil 103*a* of the starter relay 103 through the switch 102, an electromagnetic force is generated around the coil 103*a*. The starter switch 103*b* is attracted by the force and turned on. Consequently, a power source (battery) 106 supplies a current I 106 to the electromagnetic switch coil 104*b* and the starter motor 104. Thus, the engine is started.

The engine ECU 105 is supplied with electric power from the power source 106 through a terminal 108 and supplies the current I 105 to turn the starter switch 103*b* on. Likewise, the terminal 107 is supplied with electric power from the power source 106 and supplies the current I 106 to drive the starter motor 104*a*. The current I 106 becomes relatively large so that the power source voltage drops rapidly during starting of the engine.

Referring to a timing diagram of FIG. 5, the power source voltage drops below a predetermined reset level L2 at a time T1. The engine ECU 105 resets a supply of the current I 105 at the time T1, because the power source voltage is not high enough to operate the engine ECU 105 properly.

In this case, the current I 107 is continuously supplied from the terminal 107 to the coil 103*a*, as long as the key cylinder is in the start position, i.e., the switch 101 is ON. Therefore, the starter switch 103*b* stays ON and the starter motor 104*a* runs. As the starter motor 104*a* runs, a current load required to crank the engine decreases. The power source voltage increases accordingly between the time T1 and a time T2. Then, when the power source voltage reaches a predetermined return level L1 at the time T2, the reset state of the engine ECU 105 is released. Then, the engine ECU 5 restarts the supply of the current I 105 at a time T3 to start the engine. The engine can be thus started, even if the power source voltage drops rapidly during starting of the engine.

However, in a latest-type engine starting system in which an engine is started by pressing a push switch, there is no current path to supply the current I 107 when the engine ECU 105 falls into the reset state. Therefore, the engine cannot be started, if the engine ECU 105 resets the supply of the current I 105.

Specifically, the power source voltage returns to an initial level before starting of the engine, after the engine ECU 105 resets the supply of the current I 105 and the engine start-up sequence stops. Even when the engine start-up sequence is restarted and the engine ECU 105 restarts the supply of the current I 105, the power source voltage drops below the reset level L2 again. That is because the current load required to crank the engine has not been reduced. Therefore, no matter how many times the push switch is pressed for starting the engine, the engine cannot be started.

SUMMARY OF THE INVENTION

It is an object of the present invention to provide an engine starting assist system, in which an engine can be started even if a voltage of a power source drops below a reset level during starting of the engine.

An engine starting assist system includes an auxiliary ECU having a voltage booster, an engine ECU, a power source, a starter relay, and a starter. The auxiliary ECU and the engine ECU are supplied with electric power from a power source of a vehicle and supply a current to the starter relay. When the current flows through the starter relay, the power source supplies a current to the starter to crank the engine. Even when the engine ECU resets the supply of the current to the starter relay because of a voltage drop of the power source during starting of the engine, the auxiliary ECU increases a voltage supplied from the power source using the booster, thereby supplying the current to the starter relay.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
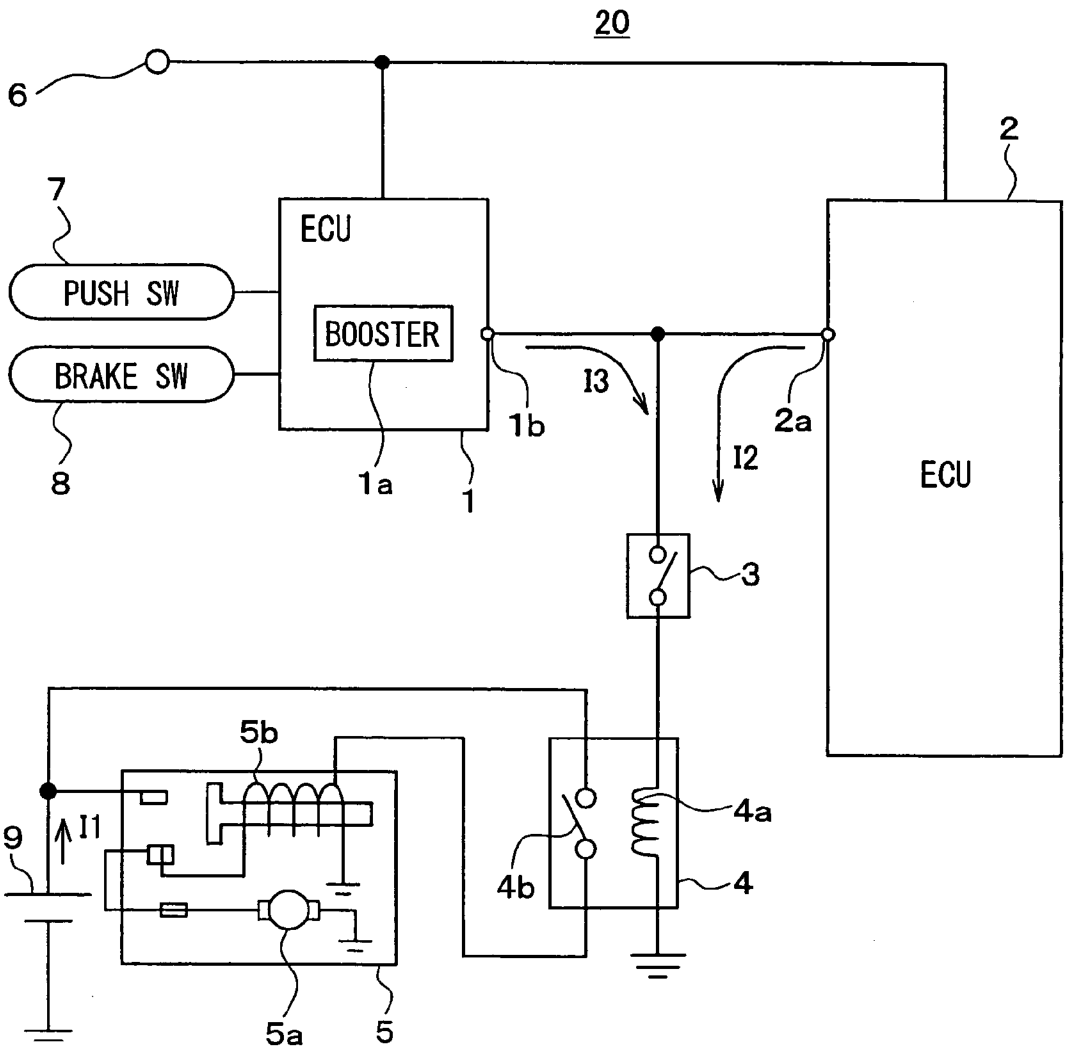
FIG. 1 is a block circuit diagram of an engine starting assist system according to a first embodiment of the present invention.

Reference is made to FIG. 1, which shows a block circuit diagram of an engine starting assist system 20. The system 20 includes an auxiliary ECU 1 having a booster 1*a,* an engine ECU 2, a switch 3, a starter relay 4, and a starter 5.

The auxiliary ECU 1 is supplied with electric power from a power source (storage battery) 9 through a terminal (power supply device) 6 and included in a power supply ECU, for example. The booster 1*a* of the auxiliary ECU 1 increases a voltage supplied from the terminal 6, when the voltage of the terminal 6 becomes lower than a predetermined level. Thus, the auxiliary ECU 1 keeps the voltage supplied from the terminal 6 above a voltage level required for the auxiliary ECU 1 to perform an engine starting assist control, i.e., to supply a current I3 to the starter relay 4.

Figure 5:
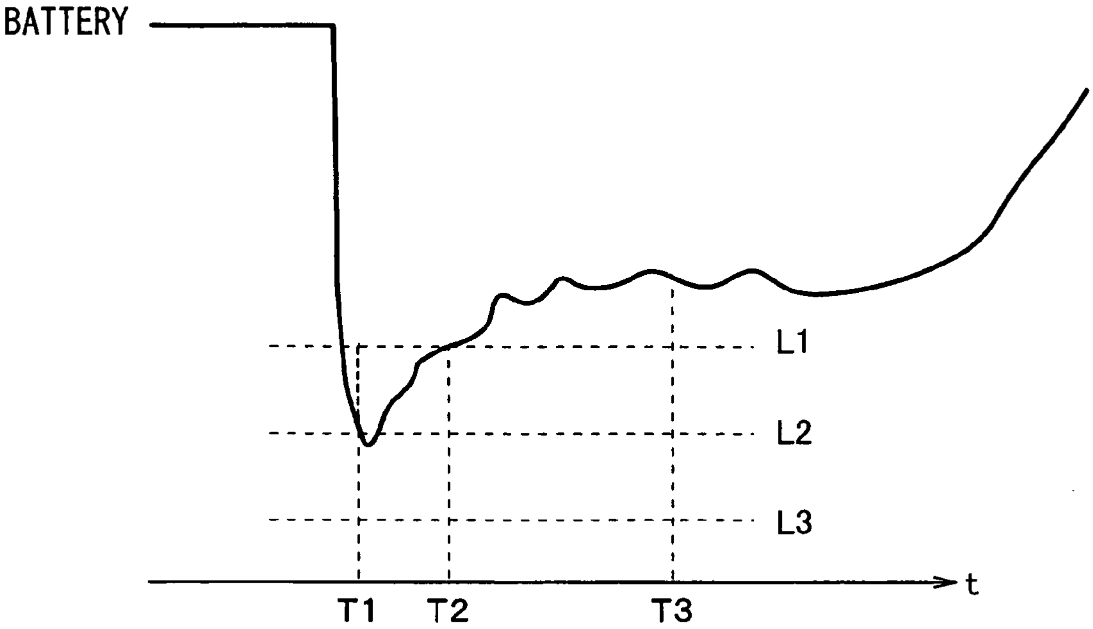
FIG. 5 RELATED ART
FIG. 5 is a timing diagram illustrating a voltage level of a power source during starting of an engine in the engine starting system of FIG. 4.

As shown in FIG. 5, a reset level L3 of the auxiliary ECU 1 is lower than a reset level L2 of the engine ECU 2 by performing the engine starting assist control. Therefore, the auxiliary ECU 1 can supply the current I3 to the starter relay 4 even when the engine ECU 2 falls into the reset state at the reset level L2. As an example, the reset level L2 is set to 4 volts and the reset revel L3 is set to 3.5 volts.

The push switch 7 provides a first signal to the auxiliary ECU 1, when the push switch 7 is pressed. The brake switch provides a second signal to the auxiliary ECU 1, when a brake pedal is pressed and the brake switch 8 is turned on. When the auxiliary ECU 1 receives the first signal from the push switch 7 while receiving the second signal from the brake switch 8, the auxiliary ECU 1 provides an engine start signal for starting the engine to the engine ECU 2 through a signal line (not shown) between the auxiliary ECU 1 and the engine ECU 2. Then, the auxiliary ECU 1 and the engine ECU 2 start to supply the current I3 and a current I2 to the starter relay 4 through an output terminal 1*b* and an output terminal 2*a,* respectively. The auxiliary ECU 1 continues to supply the current I3 for a predetermined time period, even after the engine ECU 2 falls into the reset state, i.e., resets the supply of the current I2.

Here, a first time period is defined as a time period when the engine ECU 2 falls into the reset state to when the engine ECU 2 restarts the supply of the current I2 to start the engine. A second time period is defined as a time period from when the engine ECU 2 falls into the reset state to when the engine is started by the restarted supply of the current I2.

The predetermined time period is set longer than the first time period and set shorter than the second time period to make sure the engine is started. For example, if the first time period is 150 milliseconds and the second time period is 500 milliseconds, the predetermined time period can be set to about 300 milliseconds.

Alternatively, the auxiliary ECU 1 can continuously supply the current I3 not only for the predetermined time period as long as the push switch 7 is ON. Further alternatively, the auxiliary ECU 1 can continuously supply the current I3 not only for the predetermined time period as long as the push switch 7 is ON, in case that the first attempt to start the engine ends in failure.

However, a time period during which the auxiliary ECU 1 continuously supplies the current I3 to the starter relay 4 is partly limited because of preventing breakdown of the starter 5.

Here, a third time period is defined as a time period within which the engine ECU 2 can continuously supplies I2 to the starter relay 4. A fourth time period is defied as a time period beyond which a current I1 cannot be continuously supplied to the starter 5 from the power source 9 without the breakdown of the starter 5. A fifth time period is defined as the limited time period of the current I3.

When the third time period is set to 30 seconds and the fourth time period is set to 60 seconds, the fifth time period is set to 15 seconds, for example. Specifically, the fifth time period is set shorter than a time period determined by subtracting the third time period from the fourth time period. In this case, the current I1 does not flow through the starter 5 beyond the fourth time period, even if the engine ECU 2 continuously supplies the current I2 to the starter relay 4 during the third time period. Therefore, the breakdown of the starter 5 is prevented.

The engine ECU 2 is also supplied with the electric power from the terminal 6 and performs functions such as outputting a fuel injection signal to the engine in accordance with the pressure on an accelerator (not shown).

Further, the engine ECU 2 determines whether a condition for starting up the engine is met, when the engine ECU 2 receives an engine start signal from the auxiliary ECU 1. If the condition is met, the engine ECU 2 supplies the current I2 to the starter relay 4 through the output terminal 2*a.*

Furthermore, the engine ECU 2 determines whether the voltage of the terminal 6 is higher than the reset level L2. If the voltage of the terminal 6 becomes lower than the reset level L2, the engine ECU 2 resets the supply of the current I2 to the starter relay 4. Then, the engine ECU 2 stops the supply of the current I2 until the voltage of the terminal 6 returns to a return level L1. The return level L1 is set higher than the reset level L2.

The switch 3 is turned on in accordance with a gear position. In an automatic transmission vehicle, the switch 3 is turned on, when the gear is in the neutral position or the parking position. In a manual transmission vehicle, the switch 3 is turned on, when the clutch pedal is pressed.

The starter relay 4 includes a coil 4*a* and a relay switch 4*b*. When the current I2 or the current I3 flows through the coil 4*a,* an electromagnetic force is generated around the coil 4*a*. The relay switch 4*b* is attracted by the force and turned on.

The starter 5 includes a starter motor 5*a* and an electromagnetic switch coil 5*b*. The starter 5 is powered by a power source 9, which is supplied with the electric power from the terminal 6 and supplies the current I1 to the starter 5. As an example, the power source 9 has a voltage of 12 volts under normal operation. The current I1 is controlled by turning the relay switch 4*b* on and off.

Operations of the engine starting assist system 20 will be described below.

The auxiliary ECU 1 provides the engine start signal to the engine ECU 2, when the auxiliary ECU 1 receives the first signal indicating that the push switch 7 is ON while receiving the second signal indicating that the brake switch 8 is ON. Then, the engine ECU 2 determines whether the condition for starting of the engine is met. For example, the engine ECU 2 determines whether water temperature is higher than a predetermined level, or whether an immobilizer code is authorized. If the condition is met, the engine ECU 2 supplies the current I2 to the starter relay 4 in order to drive the starter 5. Likewise, the auxiliary ECU 1 supplies the current I3 to the starter relay 4 in order to drive the starter 5.

When the current I2 or the current I3 flows through the coil 4*a* of the starter relay 4, an electromagnetic force is generated around the coil 4*a.* The starter switch 4*b* is attracted by the force and turned on. Then, the power source 9 supplies the current I1 to the electromagnetic switch coil 5*b* and the starter motor 5*a* of the starter 5. Thus, the starter motor 5*b* runs and the engine is started.

The engine ECU 2 is supplied with the electric power from the terminal 6 and supplies the current I2 to the starter relay 4. If the voltage of the terminal 6 drops below the reset level L2, the engine ECU 2 falls into the reset state and stops the supply of the current I2.

In this case, however, the booster 1*a* of the auxiliary ECU 1 increases the voltage supplied from the terminal 6, thereby keeping the voltage supplied from the terminal 6 above the voltage level required for the auxiliary ECU 1 to perform the engine start assist control. Therefore, the auxiliary ECU 1 can supplies the current I3 to the starter relay 4, even when the engine ECU 2 falls into the reset state.

Thus, the starter switch 4*b* is turned on and the power source 9 supplies the current I1 to the electromagnetic switch coil 5*b* and the starter motor 5*a* of the starter 5. Consequently, the starter motor 5*a* runs.

Then, the engine may be started. Even if the engine cannot be started, the current load required to crank the engine is reduced as the starter motor 5*a* runs. Therefore, the voltage of the terminal 6 increases accordingly. When the voltage of the terminal 6 returns to the return level L1, the reset state of the engine ECU 2 is released. Then, the engine ECU 2 restarts the supply of the current I2 to the starter relay 4, thereby starting the engine.

Figure 2A:
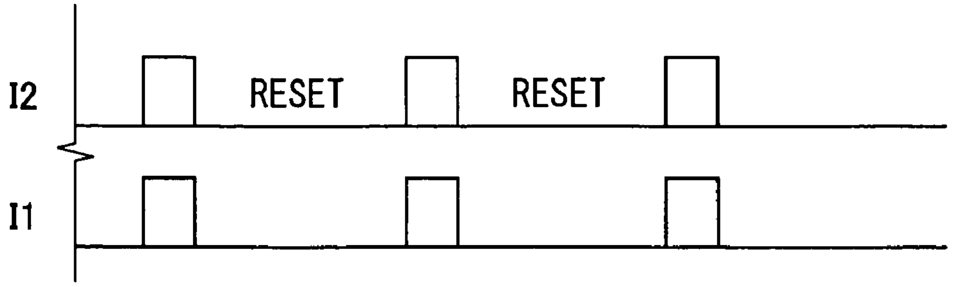
FIG. 2A is a timing diagram illustrating a starter relay activation time without an auxiliary ECU.

As shown in a timing diagram of FIG. 2A, if the assistance (i.e., the current I3) of the auxiliary ECU 1 is not provided, no current flows through the starter relay 4 during the reset state of the engine ECU 2, and therefore, the starter relay 4 is not activated. As a result, the current I1 is not supplied from the power source 9 and the starter 5 is not energized.

Figure 2B:
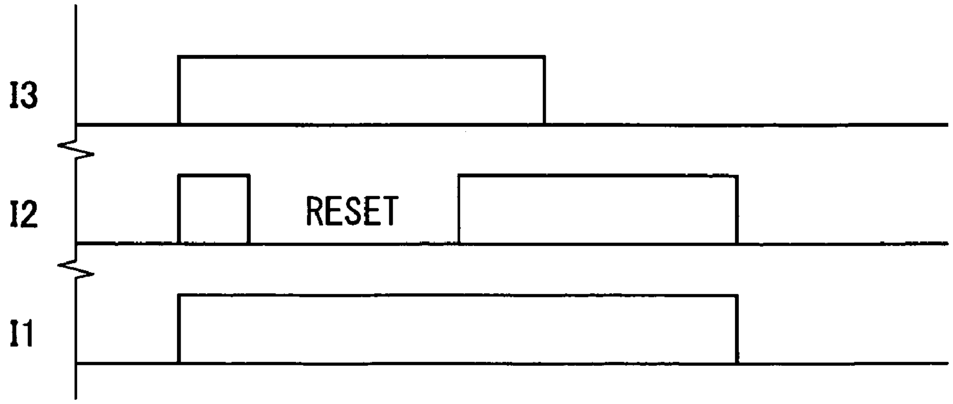
FIG. 2B is a timing diagram illustrating the starter relay activation time with the auxiliary ECU.

In contrast, as shown in a timing diagram of FIG. 2B, if the assistance of the auxiliary ECU 1 is provided, the current I3 flows through the starter relay 4 during the reset state of the engine ECU 2, and therefore, the starter relay 4 is activated. As a result, the current I1 is supplied from the power source 9 and the starter 5 is energized to start the engine.

The assistance of the auxiliary ECU 1 is provided in the system 20. Therefore, the engine can be started in the system 20, even if the engine ECU 2 falls into the reset state during starting of the engine.

Second Embodiment

Figure 3:
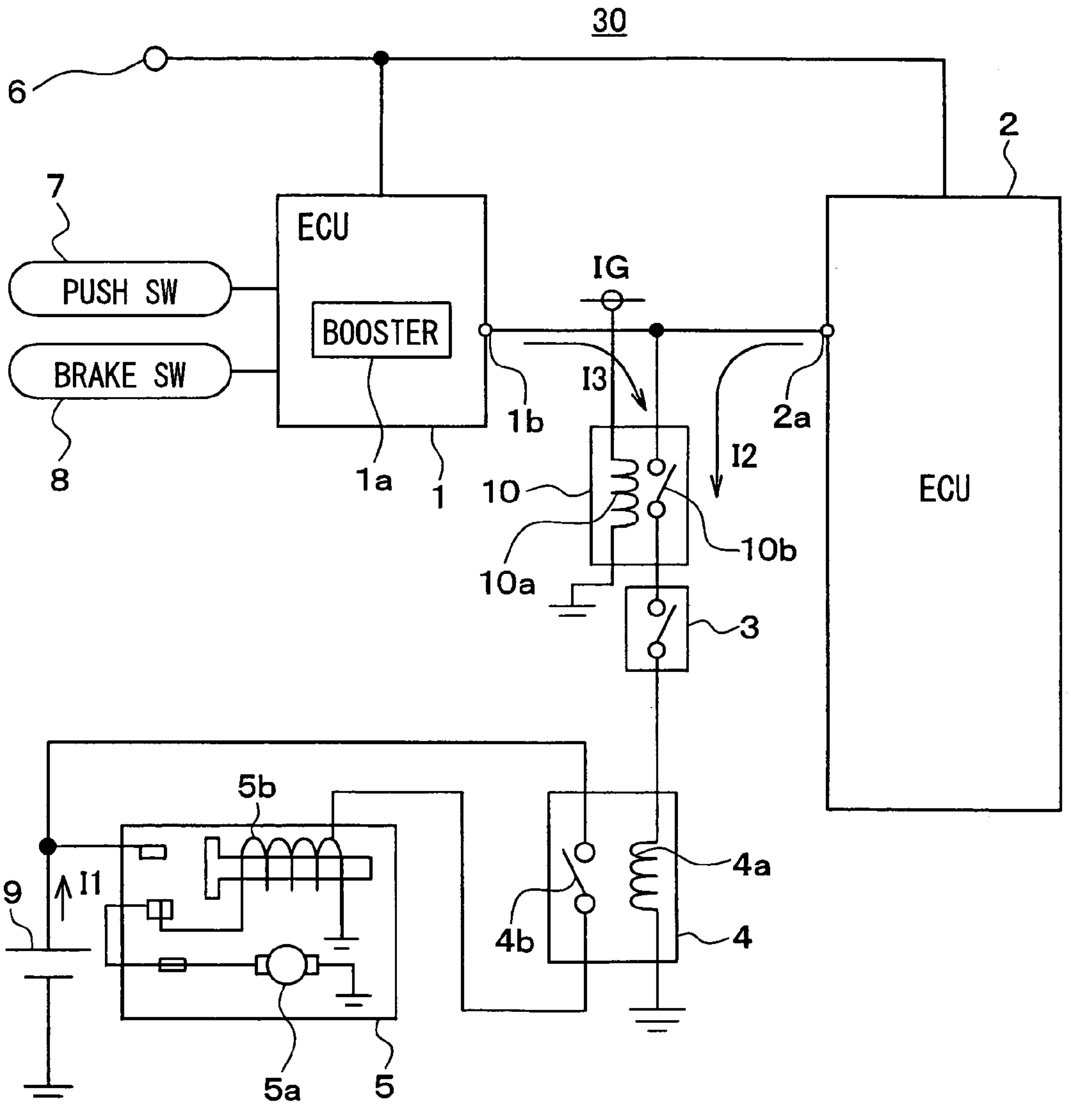
FIG. 3 is a block circuit diagram of an engine starting assist system according to a second embodiment of the present invention.
Figure 4:
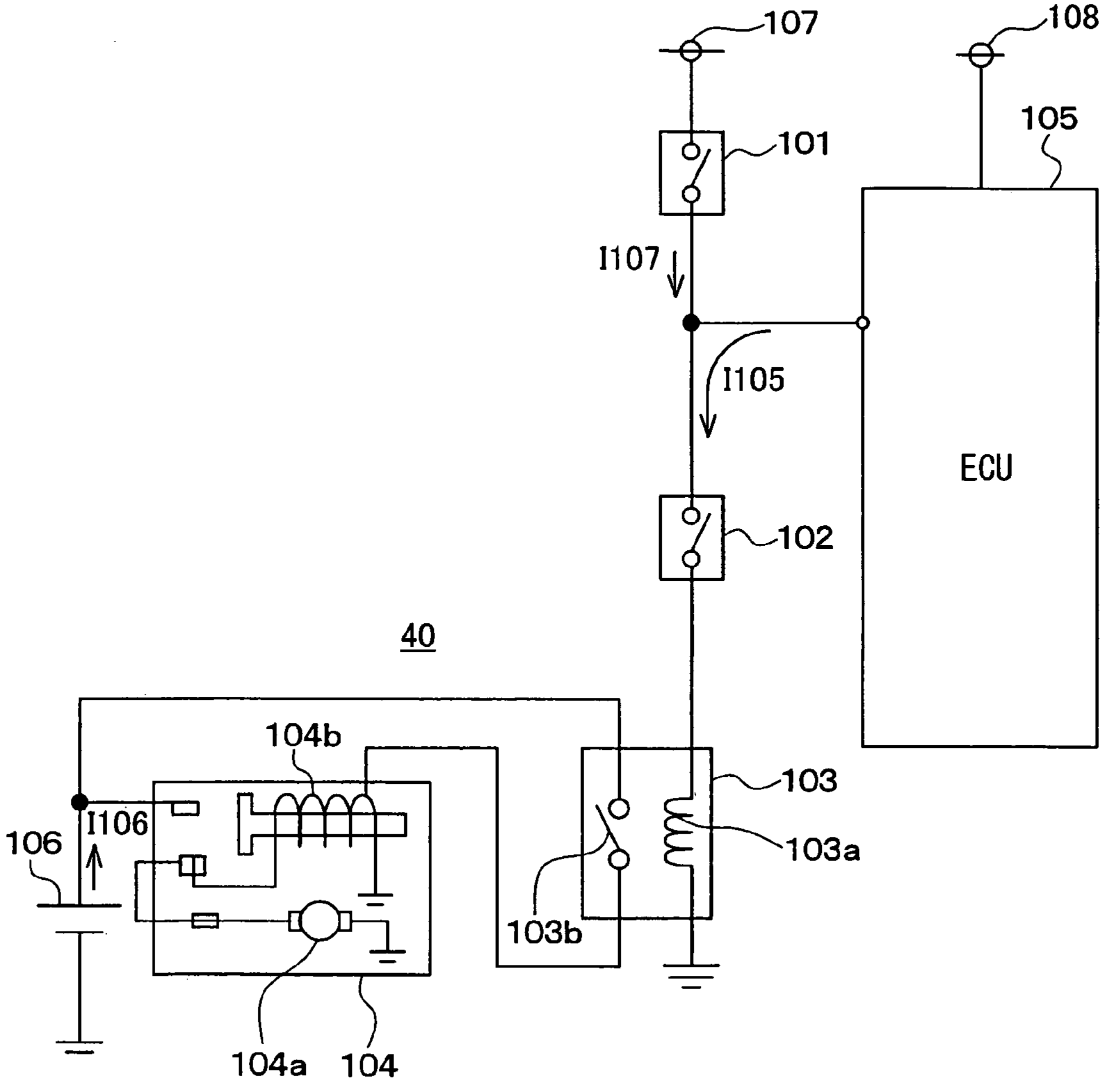
FIG. 4 RELATED ART
FIG. 4 is a block circuit diagram of an engine starting system according to a related art.

Reference is made to FIG. 3, which shows a block circuit diagram of an engine starting system 30.

The system 30 has the similar basic configuration as the system 20 and has a relay 10 besides. The relay 10 includes a coil 10*a* and a relay switch 10*b*. A voltage of an ignition switch (IG) is applied to the coil 10*a*, only when the ignition IG is ON. In other words, the voltage of the ignition switch is not applied to the coil 10*a*, when the ignition IG is OFF. When an electric current flows through the coil 10*a*, the relay switch 10*b* is turned on by magnetic attractive force generated around the coil 10*a*. The relay switch 10*b* controls a current path through which the auxiliary ECU 1 or the engine ECU 2 supplies the current I3 or the current I2 to the starter relay 4, respectively.

In short, the relay switch 10*b* is turned on and off in accordance with the ON and OFF state of the ignition switch, and accordingly the current path is turned on and off. Thus, the auxiliary ECU 1 or the engine ECU 2 supplies the current I3 or the current I2 to the starter relay 4, only when the ignition switch is ON.

If the auxiliary ECU 1 or the engine ECU 2 breaks down, the current I3 or the current I2 may be continuously supplied to the starter relay 4 at the time when the current I2, I3 are not required. However, the relay switch 10*b* interrupts the current I2, I3, when the ignition switch is turned off. Therefore, safety of the system 30 can be improved.

(Modifications)

The embodiments described above may be modified in various ways.

For example, the terminal 6 may be connected to another power source (not shown) different from the power source 9. In such a case, the voltage of the terminal 6 will no fall during staring of the engine, because the terminal 6 may not be affected by the starter motor 5*b*. The voltage of the terminal 6, however, may drop below the reset level L2 because of electrical loads other than the starter motor 5*b*, deterioration of the terminal 6, noise, temperature, for example. Even in this instance, the booster 1*a* enables the auxiliary ECU 1 to supply the current I3 to the starter relay 4. Therefore, the starter motor 5*b* runs and the engine may be started, even when the engine ECU 2 resets the supply of the current I2.

The booster 1*a* of the auxiliary ECU 1 is optional as long as the auxiliary ECU 1 can supply the current I3 to the starter 4 during the reset state of the engine ECU 2.

The above embodiments may be modified to an engine starting system in which an engine is started by turning a key cylinder instead of pressing the push switch 7.

Such changes and modifications are to be understood as being within the scope of the present invention as defined by the appended claims.

What is claimed is:

1. An assist system for starting an engine of a vehicle comprising:
- a starter;
- a power source which supplies a first electric current to the starter;
- a load driving unit which controls the first current;
- an engine control unit which is supplied with electric power from a power supply device and supplies a second electric current to the load driving unit during starting of the engine; and
- an auxiliary current supply unit which is supplied with the electric power from the power supply device and supplies a third electric current to the load driving unit during starting of the engine, wherein
- the first current is supplied to the starter when at least one of the second current and the third current is supplied to the load driving unit,
- the engine control unit resets the supply of the second current when the voltage of the power supply device becomes lower than a first predetermined level, and
- the auxiliary current supply unit supplies the third current irrespective of whether the engine control unit resets the supply of the second current.

2. The system according to claim 1, wherein
- the auxiliary current supply unit includes a booster, and
- the booster increases a voltage supplied from the power supply device to supply the third current to the load driving unit even when the engine control unit resets the supply of the second current.

3. The system according to claim 1, further comprising:
- a switch through which the second current and the third current arc supplied to the load driving unit, wherein the switch is turned on when an ignition switch of the vehicle is turned on, and the switch is turned off when the ignition switch of the vehicle is turned off.

4. The system according to claim 1, wherein the auxiliary current supply unit resets the supply of the third current when the voltage of the power supply device becomes lower than a second predetermined level lower than the first predetermined level.

5. The system according to claim 4, wherein the first predetermined level is about 4 volts, and the second predetermined level is about 3.5 volts.

6. The system according to claim 1, further comprising:

a push switch which provides a first signal to the auxiliary current supply unit when the push switch is pressed for starting the engine; and the auxiliary current supply unit provides an engine start signal for starting the engine to the engine control unit when the auxiliary current supply unit receives the first signal.

7. The system according to claim 6, further comprising:

a brake switch which provides a second signal to the auxiliary current supply unit when a brake of the vehicle is operated, wherein the auxiliary current supply unit provides the engine start signal during the second signal is received, and supplies the third current to the load driving unit during receiving the first signal from the push switch.

8. The system according to claim 7, wherein the engine control unit has a third time period within which the second current is allowed to be continuously supplied to the load driving unit, the starter has a fourth time period beyond which the first current is continuously supplied to the starter without a breakdown of the starter, and the auxiliary current supply unit supplies the third current within a fifth time period determined by subtracting the fourth time period from the third time period.

9. The system according to claim 8, wherein the fifth time period is about 15 seconds.

10. The system according to claim 1, wherein the power source and the power supply device includes respective batteries different from each other.

11. The system according to claim 1, wherein the power supply device is connected to the power source to receive the electric power of the power source.

12. The system according to claim 1, wherein the auxiliary current supply unit supplies the third current to the load driving unit for a predetermined time period after the engine control unit resets the supply of the second current, and the predetermined time period is longer than a first time period from when the engine control unit resets the supply of the second current to when the engine control unit restarts the supply of the second current and is shorter than a second time period from when the engine control unit resets the supply of the second current to when the engine is started by the restarted supply of the second current.

13. The system according to claim 12, wherein the predetermined time period is longer than 150 milliseconds.

14. The system according to claim 12, wherein the predetermined time period is about 300 milliseconds.

15. A load driving system comprising:

at least one electric load;

a first power supply means for supplying a first electric power to the load;

a second power supply means for supplying a second electric power to the load;

a battery for supplying a battery power to the first power supply means and the second power supply means; and a starter operable with the battery power supplied through the load driven with the first electric power of the second electric power, wherein the first power supply means is constructed to supply the first electric power to the load even when the second power supply means is incapable of supplying the first second electric power, the first power supply means is a first electronic control unit operable with the battery power and includes a booster for increasing the battery power to supply the first electric power to the load even when the battery power falls below a predetermined level, and the second power supply means is a second electronic control unit operable with the battery power and inoperable under a condition that the battery power is below the predetermined level.

16. The system according to claim 15, further comprising:

a push switch for generating a signal to drive the starter, wherein the first power supply means and the second power supply means supply the first electric power and the second electric power to the load in response to the signal from the push switch.

* * * * *